Figure 1:
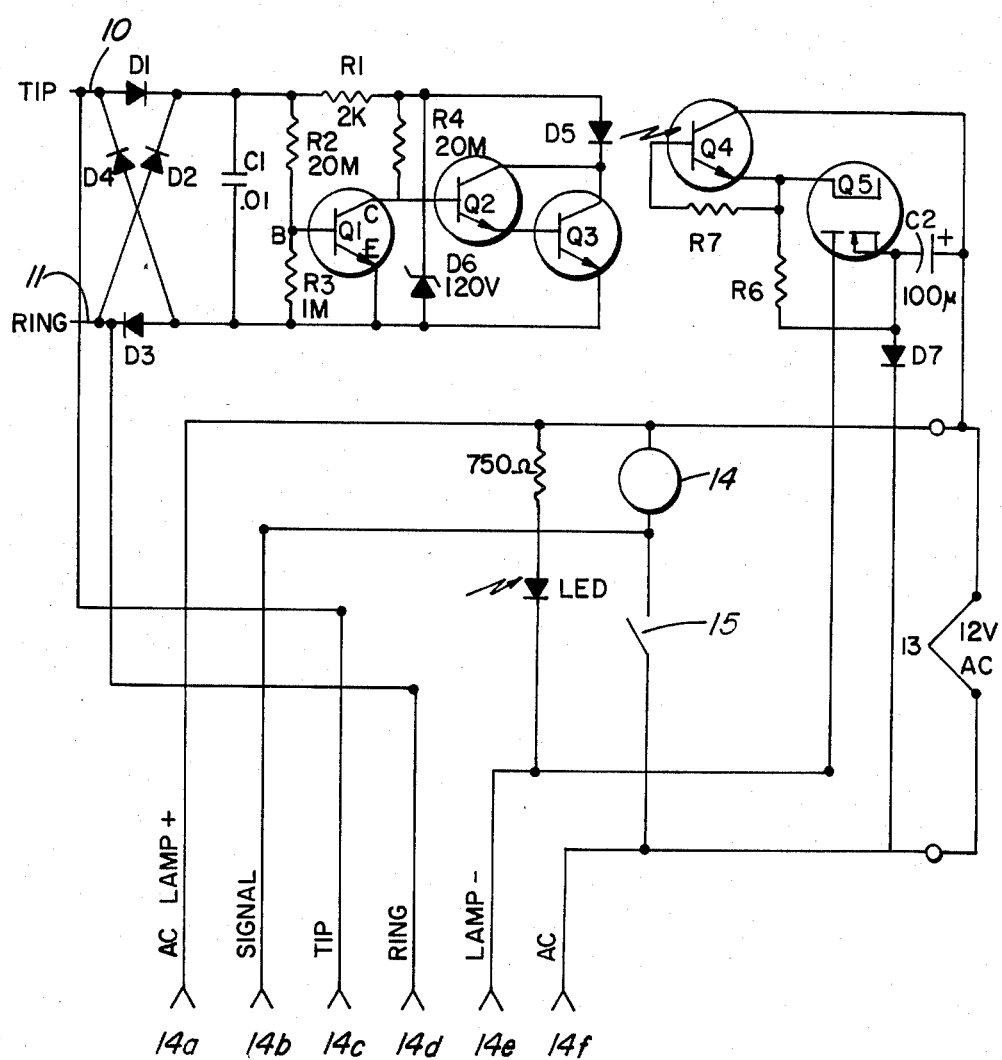

United States Patent [19]

Laing

[11] Patent Number: 4,546,214

[45] Date of Patent: Oct. 8, 1985

[54] LINE USE INDICATOR FOR TELEPHONE SETS SHARING A SINGLE LINE

[75] Inventor: Graham S. Laing, London, Canada

[73] Assignee: Northern Telecom Limited, Montreal, Canada

[21] Appl. No.: 564,499

[22] Filed: Dec. 22, 1983

[51] Int. Cl.⁴ ............................................. H04M 3/22
[52] U.S. Cl. .................................. 179/81 C; 179/17 B
[58] Field of Search ..................... 179/81 C, 17 B, 30, 179/38, 99 LS, 99 E, 18 FA, 18 AB, 18 AH, 84 L; 340/825.17; 307/315; 323/902

[56] References Cited

U.S. PATENT DOCUMENTS

| | | | |
|---|---|---|---|
| 3,567,867 | 3/1971 | Rice et al. | 179/81 C |
| 3,920,924 | 11/1975 | Layburn | 179/18 AB |
| 3,951,248 | 4/1976 | Feiner et al. | 179/81 C |
| 4,394,544 | 7/1983 | De Leon | 179/81 C X |

*Primary Examiner*—James L. Dwyer
*Attorney, Agent, or Firm*—Sidney T. Jelly

[57] ABSTRACT

Where several telephone sets are connected to a single telephone line, it would be convenient to have a visual indication that the line is in use, to avoid lifting a handset to see if there is a conversation, for example. A circuit is installed across the telephone line, the circuit having a voltage divider connected between Tip and Ring, a first transistor with its base connected to the center of the voltage divider, a second transistor with its base connected to the collector of the first transistor and a third transistor having its base connected to the emitter of the second transistor, with a light emitting device connected between either Tip or Ring conductor and the collectors of the second and third transistors. The light emitting device can be a light emitting diode. An optical coupler cooperative with the light emitting device can be used to turn on power to light emitting devices in all the telephones, from a separate power source.

6 Claims, 1 Drawing Figure

LINE USE INDICATOR FOR TELEPHONE SETS SHARING A SINGLE LINE

This invention relates to a line use indicator, and in particular to a circuit which will give an indication when a telephone line is in use, without listening. Listening to see if a line is in use interrupts a conversation.

The situation arises that a single telephone line is shared by two or more telephones—usually single line sets. A typical situation is one where a telephone system in an office, store on other premises becomes overloaded, with insufficient lines for the number of telephones required. It then happens that, for example, two people each have a telephone, plus also for example, one or more secretaries each with a telephone, are all connected to a common single telephone line. A similar situation can be deliberately produced if individual use of telephones is very limited, to provide a more economic system.

However, it is desirable that it be possible to tell if the common line is being used by any of the telephone sets connected to it. The present invention provides for a visual indicator, such as a lamp, to be lit when the line is in use. When the line is not being used, the lamp is not lit.

Broadly, the invention comprises a circuit, installed across the line, the circuit having a voltage divider, a first transistor having its base connected to the center of the voltage divider, a second transistor having its base connected to the collector of the first transistor, a third transistor having its base connected to the emitter of the second transistor and a light emitting device connected between one of the telephone conductors and the collectors of the second and third transistors. The light emitting device can be a light emitting diode. The light emitting device can be optically coupled to a detector which can be caused to turn on power to light emitting devices powered from a separate power supply.

The invention will be readily understood by the following description in conjunction with the accompanying drawing of a typical circuit.

As illustrated in the drawing, the Tip and Ring conductors of a telephone line are indicated at 10 and 11 respectively. A polarity guard is provided, consisting of the diodes, D1, D2, D3 and D4. A capacitor C1 acts to prevent the circuit from operating during line ringing and resistor R1 and diode D6 act as a protective circuit in case of excessive voltage, for example a lightening strike.

The line voltage appears across the two resistors R2 and R3, which act as a voltage divider, the center point being connected to the base of transistor Q1. When the line voltage is high, as when the telephone line is not in use, the voltage at the base of Q1 is sufficient to cause Q1 to conduct. With Q1 conducting the voltage at the base of Q2 is low, preventing Q2 and Q3 from conducting. The emitter of Q2 is connected to the base of Q3 and the collectors of Q2 and Q3 are connected. A light emitting device, indicated at D5, is connected between the Tip conductor 10 and the collectors of Q2 and Q3. The light emitting device D5 can be a discrete device operating from a circuit located in each telephone set. This has the disadvantage of requiring sufficient series resistance with the device to prevent excessive current drain on the line. The device will not be very bright, especially on long lines.

An alternative is to use the light emitting device, which could be a light emitting diode, in an optical coupler. This is illustrated in the drawing. The device D5 is coupled to a detector Q4 which controls a switch Q5 to turn on power from a separate power supply indicated at 13. With such an arrangement, it is possible to use one circuit to control lighted indicators in more than one telephone set. The connections to further telephone sets are indicated by conductors 14a to 14f.

With the device D5 being a light emitting diode, the switch Q5 can be a triac. As the power source at 13 is 10 volts AC, diode D7 and capacitor C2 are provided to give a DC power supply for light emitting diodes in the further telephone sets.

The arrangement is extremely simple. As stated, with no telephone sets in use, the voltage at the base of transistor Q1 is sufficient for it to be conducting, with transistors Q2 and Q3 non-conducting. If any telephone set connected to a line goes "off hook", the voltage in the line drops, and the voltage at the base of the transistor Q1 is insufficient to maintain the conductive state. With Q1 non-conductive, the voltage at the base of Q2 becomes sufficient to make Q2 conductive and hence also Q3. This causes the device D5 to become emitting. Via the optical coupling, detector Q4 and the remaining part of the circuit, lighted indicators will be powered in the other sets connected to the same line.

The circuit presents a high impedance to the line when the line is not in use. It meets the requirement of a maximum of 10 A with up to a 100 V applied to the line. By using optical coupling, the current drain is lower when the line is in use because the current requirements are lower, and by using the coupler to turn on power to the light emitting devices from a separate power source, the devices can be operated at a good visual level. Also devices requiring higher current supply, such as incandescent lamps, can be used. The coupler isolates the line from the auxiliary power supply.

A buzzer 14, actuated by a switch 15, can be provided.

Only one circuit is required per line, although two or three, or possibley even more telephone sets are connected to the same line.

What is claimed is:

1. A line indicator for telephone sets sharing a single telephone line, comprising a circuit installed across the line, between Tip and Ring conductors of the line, the circuit including a voltage divider connected between said Tip and Ring conductors, a first transistor having its base connected to the center of the voltage divider, a second transistor having its base connected to the collector of the first transistor, a third transistor having its base connected to the emitter of the second transistor, and a light emitting device connected between one of said Tip and Ring conductors and the collectors of said second and third transistors, the emitters of said first and third transistors being connected to the other of said Tip and Ring conductors.

2. A line use indicator as claimed in claim 1, including an optical coupler, said optical coupler including said light emitting device, a detector and a switch, said switch switching on a power supply on actuation of said detector by said light emitting device.

3. A line use indicator as claimed in claim 2, in which said light emitting device is a light emitting diode.

4. A line use indicator as claimed in claim 2, said switch switching power to a light emitting device in each telephone set sharing said single telephone line.

5. A line use indicator as claimed in claim 4 the light emitting device in each telephone set being a light emitting diode.

6. A line use indicator as claimed in claim 5 said switch switching an AC power supply, and including a diode and a capacitor connected to said switch to provide a DC power supply for said light emitting devices.

* * * * *